May 14, 1968     W. W. WARD     3,383,152
MIRROR MOUNTING SYSTEM WHICH INCLUDES FOAM MATERIAL
TO SECURE THE MIRROR
Filed Oct. 28, 1963

INVENTOR.
WALLACE W. WARD
BY
ATTORNEY tions can be resorted to which fall within the scope of the claim hereunto appended.

United States Patent Office 3,383,152
Patented May 14, 1968

3,383,152
MIRROR MOUNTING SYSTEM WHICH INCLUDES FOAM MATERIAL TO SECURE THE MIRROR
Wallace W. Ward, Chatham Township, Morris County, N.J., assignor to Diecasters, Inc., Closter, N.J., a corporation of New Jersey
Filed Oct. 28, 1963, Ser. No. 319,352
1 Claim. (Cl. 350—61)

The present invention relates to a mirror mounting system, and it particularly relates to an automobile mirror mounting system.

It is among the objects of the present invention to provide a mirror mounting system and particularly a mirror mounting system in which the mirror may be permanently mounted in place and will be permanently bonded so as not to subject it to breakage or dislodgment and it will also be resistant to shock.

Another object is to provide a mirror mounting system in which the mirror is mounted in a receptacle with a substantially permanent bond over the entire rear area and edge area thereof which mirror will be fall-out proof, shatter proof and fog proof.

A further object is to provide a mirror mounting system which will assure substantially complete and permanent mounting of the mirror and at the same time will eliminate any mounting rings, springs or gaskets and which will also eliminate any spot gluing arrangements.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to utilize a mounting material composed of a synthetic foam material which is used to fill the space in a receptacle in which the mirror is mounted.

Usually the back plate or holder will take the form of a cup, the sides and top and bottom walls of which are shaped to conform to the shape or outline or contour of the mirror.

Normally the receptacle, container or holder is provided with a spaced locating lock which will fix the position of the mirror, and the foam material in fluid condition is caused to flow around the edge of the mirror and to fill the space in back of the mirror inside of the receptacle.

As an alternative construction, the mirror may be placed in position after the foaming material in fluid condition is caused to fill the space in back of the mirror.

In either case, the mirror is held in position until the foam finally sets and loses its fluid condition and takes the form of a porous shock proof backing for holding and enveloping both the back and the edges of the mirror.

Although a wide variety of different types of foaming materials may be employed, it has been found most satisfactory to utilize a polyurethane co-polymer foam.

Other types of foam may also be employed such as a synthetic rubber foam, a polystyrene or other plastic foams.

The preferred foaming material is desirably of a type known as Nopco 602 which is derived from an isocyanate-polyether combination.

It is important that all of the spaces in back and around the edges of the mirror be substantially completely filled with the liquid foam which will fill up the entire open structure inside of and in back of the mirror.

The foam will adhere to the back of the mirror and will form an adherent bond to the lacquered finish on the rear of the mirror whether it be of metal or glass.

Furthermore, the foaming of the plastic material will tend to seal up any spaces to the rear of the mirror, and will hold the mirror firmly in position.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views.

Figure 3:
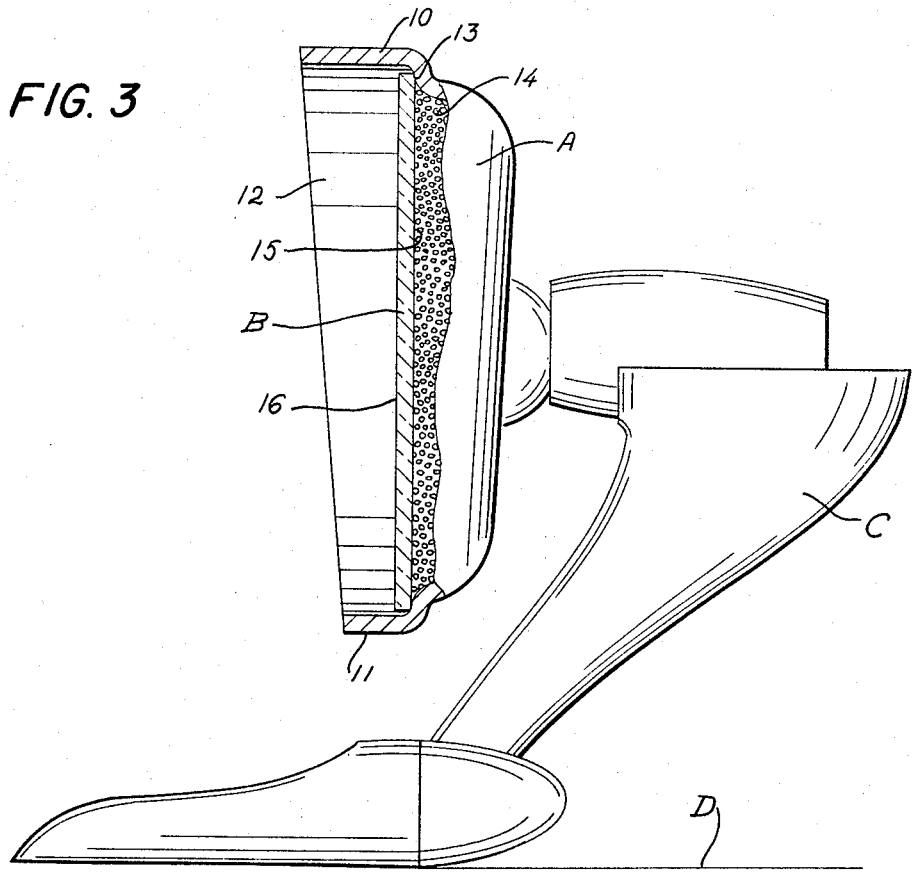
FIG. 3 is a transverse sectional view with the mirror in upright position and upon an enlarged scale as compared to FIGS. 1 and 2 with the mirror completely formed in place.

Referring to the drawings, there is shown in FIG. 3 a typical automobile mirror having a housing or casing A, a mirror B and a holder construction C mounting it upon the automobile body D.

It will be noted that the receptacle or enclosure A has the top and bottom walls 10 and 11 and the side wall 12 with the mounting shoulder 13 which runs around the entire wall construction and mounts the mirror intermediate of the mirror B substantially inside of the receptacle A.

The shoulder 13 which supports or registers the mirror inside of the receptacle A is normally positioned substantially inside the outer edges of the walls 10, 11 and 12.

Either before or after the mirror B is placed in position, against the shoulder 13, the inside space 14 is filled with a fluid self-foaming material indicated which will be caused to adhere to the rear of the mirror and hold it firmly in position.

The mirror B is desirably held in position while the foam is solidifying and changing from liquid to solid form, and it is made certain that there is sufficient foam placed in the space 14 to contact or cover the entire back surface 15 of the mirror B and also flow into any openings around the periphery of the mirror B without at any time flowing upon the face 16 of the mirror B.

Figure 1:
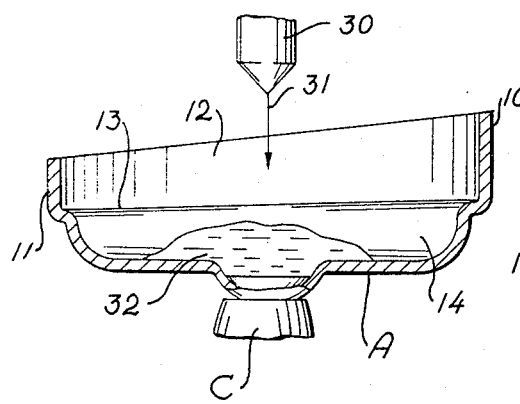
FIG. 1 is a diagrammatic side sectional view showing the manner in which the liquid forming material may be charged into the mirror receptacle holder.
Figure 2:
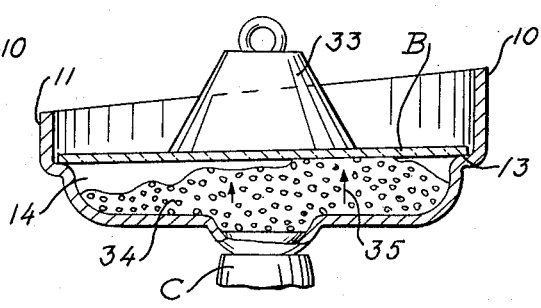
FIG. 2 is a diagrammatic side sectional view similar to FIG. 1 showing the next stage in operation with the foam in position and expanding and the mirror also in position.

FIGS. 1 and 2 show the manner in which the liquid mixture is charged into the housing A.

As indicated in FIG. 1, there is a spout 30 discharging the foaming mixture 31 so that the liquid mixture as indicated at 32 will partly fill the interior and will expand in sufficient quantity to expand up to the position of the shoulder 13 and fill the space in back of the mirror B as shown in FIG. 3.

After sufficient liquid has been placed in the receptacle A to fill the space up to the shoulder 13, the mirror B is placed in position and is weighed down by the weight 33 with the foam 34 expanding as indicated by the arrows 35 until it fills the entire space 14 inside of the shoulder 13.

Any foam that may accidentally flow upon the face or over the edges may be readily removed or scraped away.

The mirror B whether of glass or of metal will have a lacquered back which will substantially integrate with the self-foaming material so that the self-foaming material will tightly engage and hold such mirror in position.

The mirror mounting system as above described will hold the mirror firmly in position to the adjacent sides and to the base of the receptacle and there will be a permanent bond over nearly 100% over the back of the mirror.

The mirror will be fall-out proof, shatter proof and fog proof, and this mounting system will eliminate rings, springs and gaskets and also spot glue arrangements.

Various types of synthetic plastic foams may be employed for this purpose.

The foam will form a shock absorbent base and may engage the edges as well as the back of the mirror and assure that there will be no breakage even with a sudden blow or other event which might tend to shatter or break the mirror.

Although preferably directed to automobile mirror mountings, it is also possible to utilize this mounting system for mirror locations where it is desired to firmly hold the mirror in position and at the same time protect it against tendency of shattering or breakage.

Furthermore, the foam not only gives a cushion mounting but also will insulate the mirror against changes in temperature as might result in causing it to fog or lose its clarity.

The important features of the present invention reside in pouring the foam forming material into place and causing it to form in place.

It is important that exothermic reactive foam materials be utilized which will generate their own foam without external heating.

If external heat would be necessary, the mirror structure would be disadvantageously effected.

Although polyurethane foam is a preferred exothermic self-foaming material, other foams may be employed to give equivalent results.

As many changes could be made in the above mirror mounting system, and many widely different embodiments of this invention could be made without departing from the scope of the claim, it is intended that all matter contained in the above description shall be interpreted as illustrative and not in a limiting sense.

Having now particularly described and ascertained the nature of the invention, and in what manner the same is to be performed, what is claimed is:

1. A shatter proof, fall-out proof and fog proof automotive mirror of the type having a cup-like receptacle having side walls and a bottom wall and a mirror mounted therein, said receptacle having a shoulder ledge contacting the periphery of said mirror and locating the mirror within the receptacle intermediate of the depth of the side walls and above the bottom wall, leaving an open space between the bottom wall and back of the mirror and a polyurethane foam material adhering to the side and bottom walls of said receptacle and adhering to and covering the back of the mirror and completely filling the space between the back of the mirror and bottom wall, said mirror having a lacquered finish on its back integrated with and united with the adjacent portion of the polyurethane foam material, the foam material and the shoulder ledge being the sole means maintaining said mirror within said cup-like receptacle.

References Cited

UNITED STATES PATENTS

| | | | |
|---|---|---|---|
| 1,786,958 | 12/1930 | Oestnaes | 350—103 |
| 3,326,624 | 6/1967 | Von Maydell et al. | 350—288 |
| 765,873 | 7/1904 | Berry | 88—96 |
| 2,082,857 | 6/1937 | Thoroughgood et al. | |
| 2,690,987 | 10/1954 | Jeffries et al. | |
| 2,789,464 | 4/1957 | Williams | 88—98 |
| 3,048,084 | 8/1962 | Iannuzzi | 88—87 |
| 3,160,549 | 12/1964 | Caldwell et al. | 161—190 XR |

JEWELL H. PEDERSEN, *Primary Examiner.*

O. B. CHEW, *Assistant Examiner.*